United States Patent
Shetty et al.

(10) Patent No.: US 9,197,380 B2
(45) Date of Patent: Nov. 24, 2015

(54) REPEATER NODES IN SHARED MEDIA NETWORKS

(75) Inventors: Sandeep Jay Shetty, San Jose, CA (US); Shmuel Shaffer, Palo Alto, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 556 days.

(21) Appl. No.: 12/971,148

(22) Filed: Dec. 17, 2010

(65) Prior Publication Data
US 2014/0006893 A1    Jan. 2, 2014

(51) Int. Cl.
H04L 1/18    (2006.01)
H04L 1/00    (2006.01)

(52) U.S. Cl.
CPC ....... H04L 1/1867 (2013.01); H04L 2001/0097 (2013.01)

(58) Field of Classification Search
CPC .................. H04L 2001/0097; H04L 1/1867
USPC ......................................................... 714/749
See application file for complete search history.

(56) References Cited

U.S. PATENT DOCUMENTS

| | | | | |
|---|---|---|---|---|
| 4,074,232 A | * | 2/1978 | Otomo et al. | 714/750 |
| 4,445,214 A | * | 4/1984 | Reynolds et al. | 370/389 |
| 4,584,679 A | * | 4/1986 | Livingston et al. | 714/749 |
| 4,628,504 A | * | 12/1986 | Brown | 370/458 |
| 4,745,593 A | * | 5/1988 | Stewart | 370/244 |
| 4,977,499 A | * | 12/1990 | Banning et al. | 709/237 |
| 5,031,174 A | * | 7/1991 | Natsume | 370/452 |
| 5,247,381 A | * | 9/1993 | Olmstead et al. | 398/58 |
| 5,528,605 A | * | 6/1996 | Ywoskus et al. | 714/749 |
| 5,736,933 A | * | 4/1998 | Segal | 340/7.22 |
| 6,132,306 A | | 10/2000 | Trompower | |
| 6,205,481 B1 | * | 3/2001 | Heddaya et al. | 709/226 |
| 6,424,626 B1 | * | 7/2002 | Kidambi et al. | 370/236 |
| 6,725,255 B1 | * | 4/2004 | Hass et al. | 709/206 |
| 6,741,554 B2 | * | 5/2004 | D'Amico et al. | 370/225 |
| 6,973,230 B1 | | 12/2005 | Mackay | |

(Continued)

FOREIGN PATENT DOCUMENTS

CN    1823489 A    8/2006

OTHER PUBLICATIONS

Laneman, et al., "Cooperative Diversity in Wireless Networks: Efficient Protocols and Outage Behavior", IEEE Transactions on Information Theory, vol. 50, No. 12, Dec. 2004, pp. 3062-3080.

(Continued)

*Primary Examiner* — Amine Riad
(74) *Attorney, Agent, or Firm* — Parker Ibrahim & Berg LLC; James M. Behmke; Stephen D. LeBarron

(57) ABSTRACT

In one embodiment, a repeater node in a shared media network may intercept a shared media transmission from a first node to a second node. Once a shared media transmission is intercepted, the repeater node may determine whether the second node returns an acknowledgement (ACK) to the first node. If the second node does not return an ACK to the first node, the repeater node repeats the shared media transmission to the second node. Also, according to one or more additional embodiments of the disclosure, when receiving an ACK at the repeater node from the second node in response to the repeated shared media transmission, the repeater node may also forward the ACK from the second node to the first node.

18 Claims, 14 Drawing Sheets

(56) References Cited

U.S. PATENT DOCUMENTS

| | | | |
|---|---|---|---|
| 7,161,947 | B1 | 1/2007 | Desai |
| 7,257,220 | B1 | 8/2007 | Marshall et al. |
| 7,376,122 | B2 | 5/2008 | Draves, Jr. et al. |
| 7,376,612 | B1* | 5/2008 | Kwan ............................. 705/37 |
| 7,486,630 | B1 | 2/2009 | Mackay |
| 7,519,081 | B2 | 4/2009 | Sorenson et al. |
| 7,631,021 | B2* | 12/2009 | Sarma et al. ......................... 1/1 |
| 7,634,536 | B2 | 12/2009 | Halasz |
| 7,801,096 | B2 | 9/2010 | Myles et al. |
| 8,204,179 | B2* | 6/2012 | Goldman et al. ............... 379/52 |
| 8,667,116 | B2* | 3/2014 | Manjeshwar et al. ........ 709/224 |
| 2006/0233200 | A1* | 10/2006 | Fifield et al. .................. 370/473 |
| 2007/0147245 | A1* | 6/2007 | Foore et al. .................... 370/231 |
| 2007/0208838 | A1 | 9/2007 | Balasubramaniam |
| 2008/0222478 | A1* | 9/2008 | Tamaki ......................... 714/749 |
| 2009/0086623 | A1* | 4/2009 | Gao et al. ...................... 370/221 |
| 2010/0157889 | A1* | 6/2010 | Aggarwal et al. ............. 370/328 |

OTHER PUBLICATIONS

Toumpoulidis, "PCT Notification of Transmittal of the International Search Report and the Written Opinion of the International Searching Authority, or the Declaration", International Application No. PCT/US2011/065407, mailed Apr. 2, 2012, 10 pages, European Patent Office, Rijswijk, Netherlands.

Bai, et al., "Notification Concerning Transmittal of International Preliminary Report on Patentability" Patent Cooperation Treaty, International Application No. PCT/US2011/065407, mailed Jun. 27, 2013, 9 pages, The International Bureau of World Intellectual Property Organization, Geneva, Switzerland.

Winter et al., "RPL: IPv6 Routing Protocol for Low Power and Lossy Networks," <draft-ietf-roll-rpl-15>, Nov. 11.

\* cited by examiner

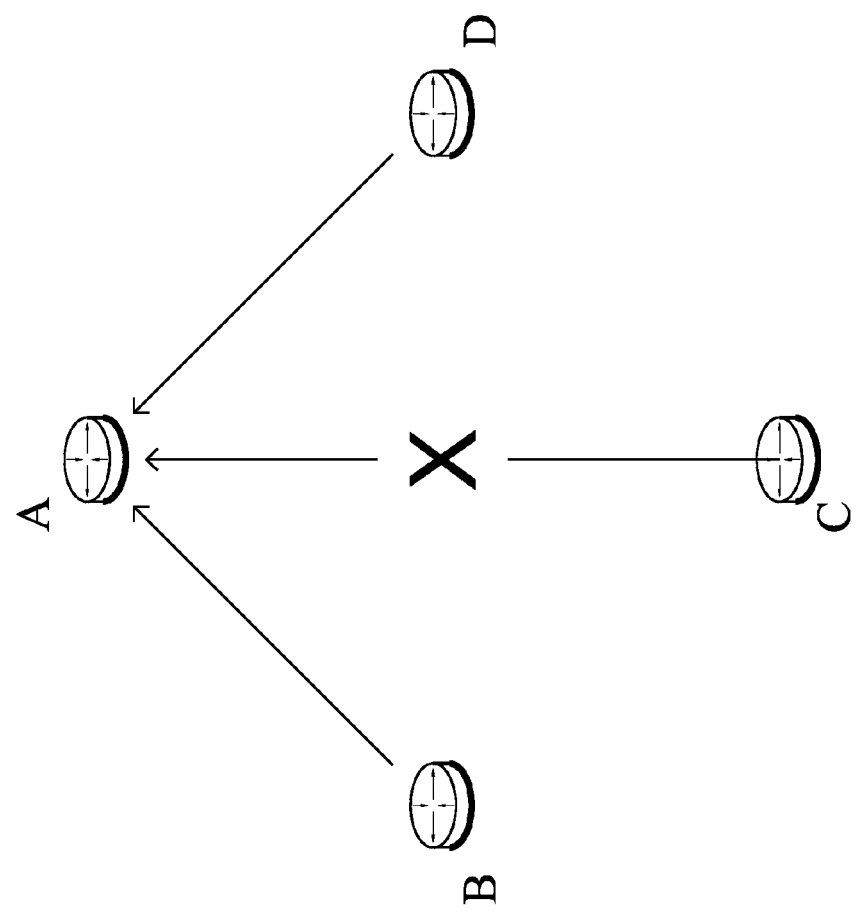

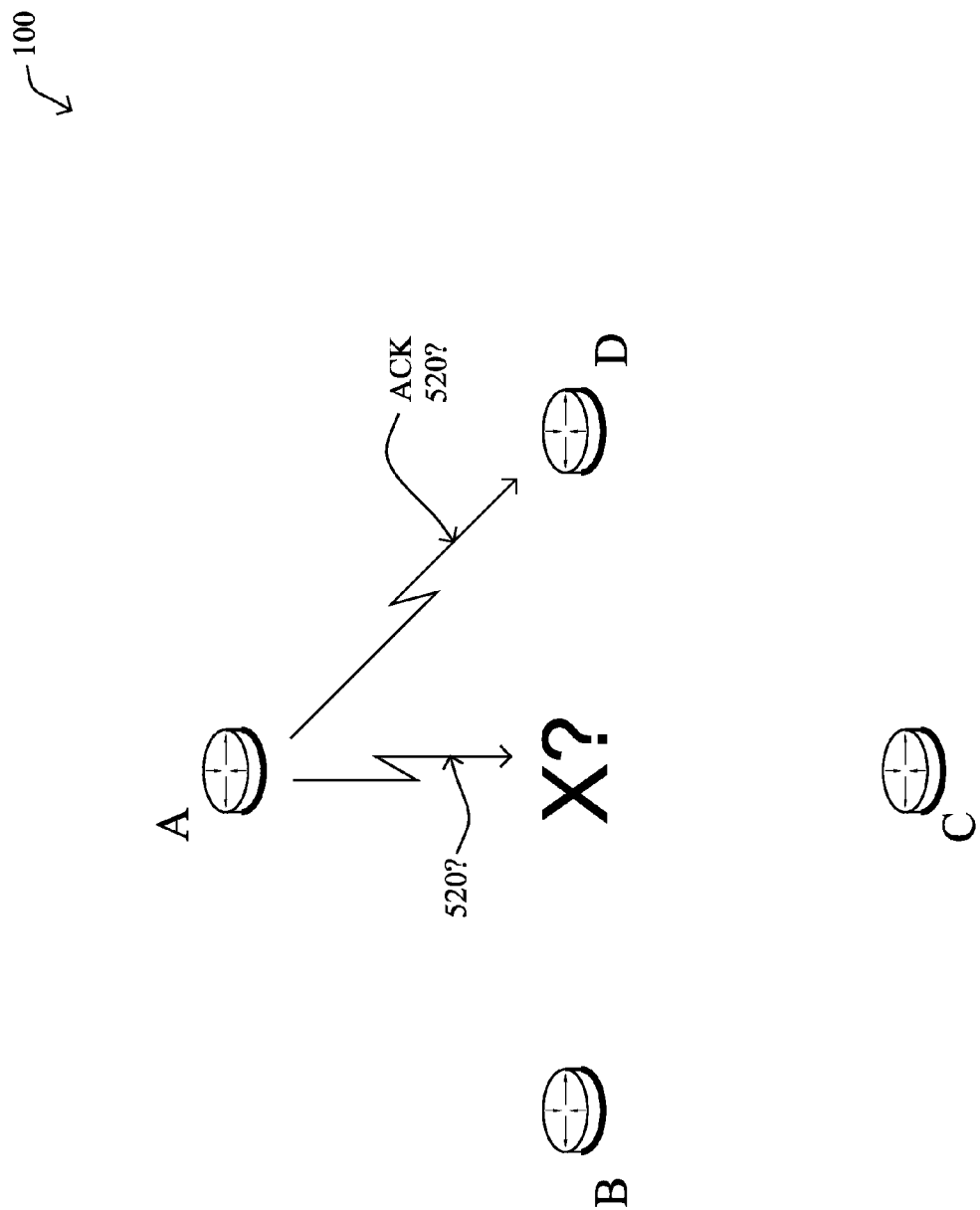

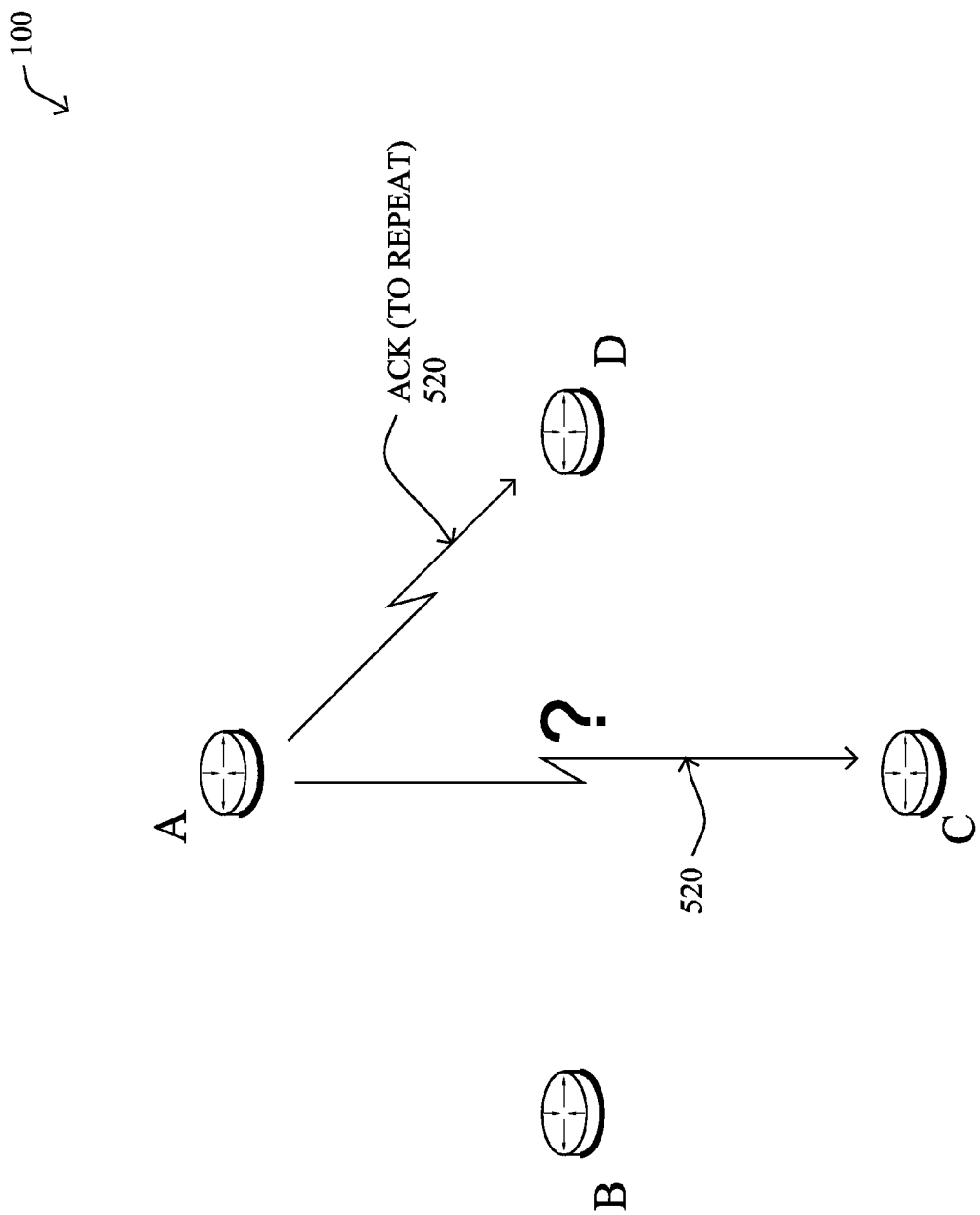

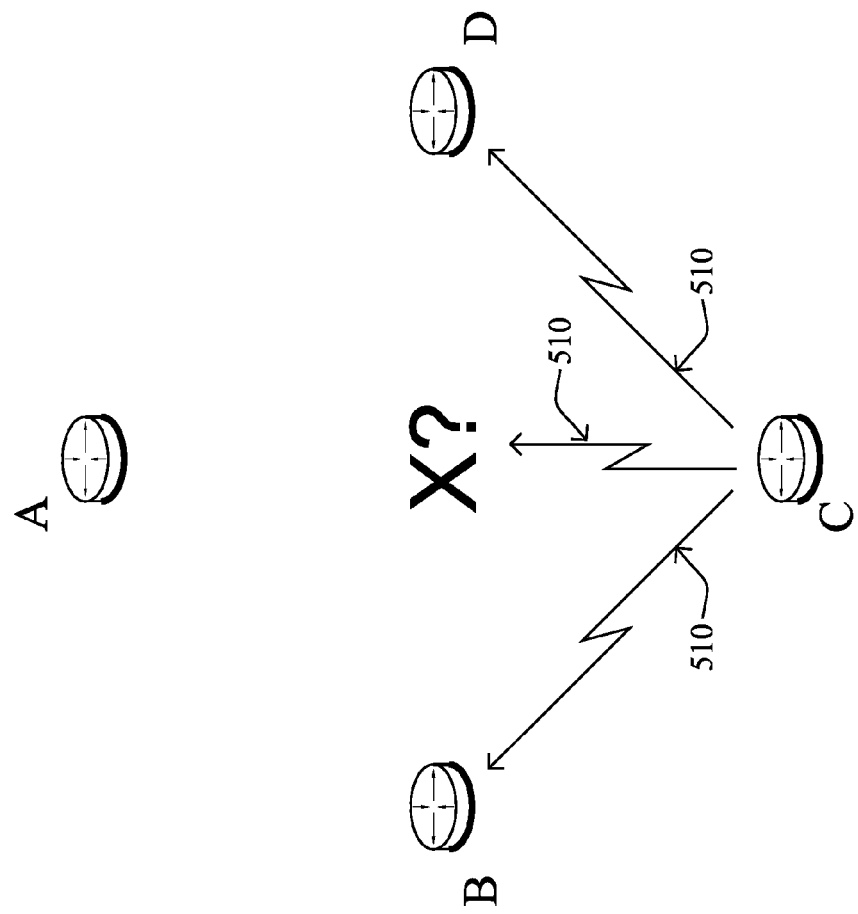

REPEATER NODES IN SHARED MEDIA NETWORKS

TECHNICAL FIELD

The present disclosure relates generally to shared media networks, and, more particularly, to management of lossy links in shared media (e.g., wireless, powerline communication, etc.) networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

One very critical issue faced in LLNs is the high degree of "lossy-ness", where the percentage of packets dropped can become extremely high, and where the link quality is hardly predictable, such as due to a number of factors, e.g., electromagnetic interference, noise, etc. Another common reason for packet loss in wireless mesh networks which are used for example in Advanced Metering Infrastructure (AMI) may be a truck or a car which is parked in front of a home and temporarily blocks a specific radio path. For instance, for LLNs established using wireless communication and/or powerline communication (PLC), it is fairly common for links to flap with a very high frequency, and there is generally no way to predict link behavior. For instance, due to the lossy-ness, it is often the case that a node transmitting over a shared media communication to another node may not always reach the intended recipient, or may reach the intended recipient, but may not always receive an acknowledgement (ACK) from the recipient (i.e., the ACK is lost in the return transmission).

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example link failure in the shared media network;

FIGS. 5A-C illustrate an example message exchange for repeating transmissions;

FIGS. 6A-B illustrate another example message exchange for repeating transmissions, namely acknowledgments;

FIGS. 7A-B illustrate another example message exchange with a plurality of repeater nodes;

DESCRIPTION OF EXAMPLE EMBODIMENTS

Overview

Figure 1:
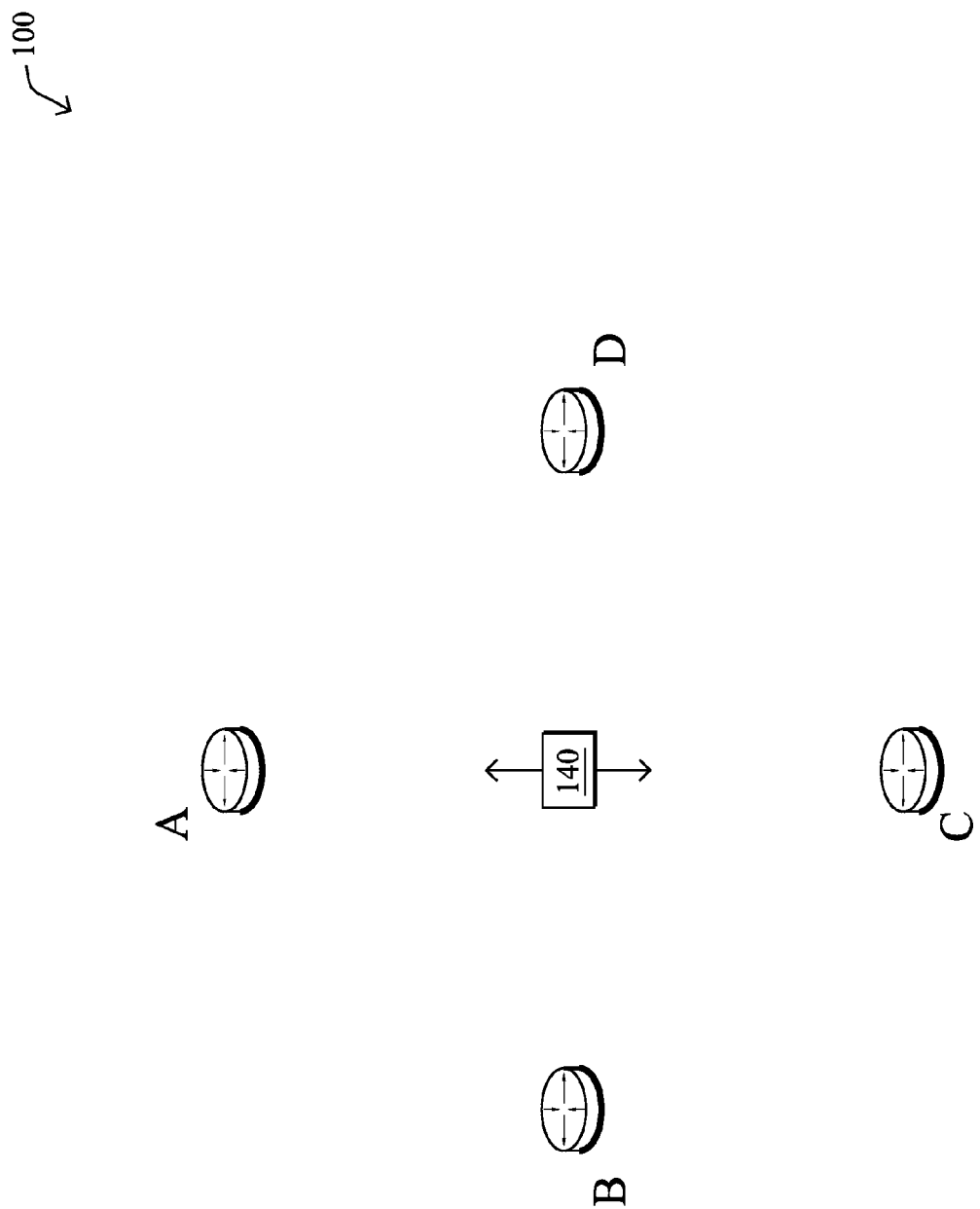
FIG. 1 illustrates an example shared media network.

According to one or more embodiments of the disclosure, a repeater node in a wireless network may intercept a shared media transmission from a first node to a second node. Once a shared media transmission is intercepted, the repeater node may determine whether the second node returns an acknowledgement (ACK) to the first node. If the second node does not return an ACK to the first node, the repeater node repeats the shared media transmission to the second node. Also, according to one or more additional embodiments of the disclosure, when receiving an ACK at the repeater node from the second node in response to the repeated shared media transmission, the repeater node may also forward the ACK from the second node to the first node.

DESCRIPTION

A network is a geographically distributed collection of nodes interconnected by communication links and segments for transporting data between end nodes, such as personal computers and workstations, or other devices, such as radios, sensors, etc. to Many types of computer networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC), and others.

A wireless network, in particular, is a type of shared media network where a plurality of nodes communicate over a shared wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities," and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example shared media network 100 (e.g., computer network, communication network, etc.) illustratively comprising nodes/devices labeled as shown ("A," "B," "C," and "D") interconnected by shared media communication. Illustratively, shared media communication is communication that other nodes may listen-in or "eavesdrop" on other nodes communications, such as, for instance, wireless communication, or powerline communication (PLC), etc., as may be appreciated by those skilled in the art. Certain nodes, such as, e.g., routers, sensors, computers, radios, etc., may be in communication with other nodes within a shared media network 100 based on, e.g., distance, signal strength, current operational status, location, etc. Those skilled in the art will understand that any number of nodes, devices, links, etc. may be used in the shared media network, and that the view shown herein is for simplicity (particularly, that while wireless routers are shown, any shared media communication devices A-D may be utilized). Also, while the embodiments are shown herein with reference to a generally shared media (e.g., wireless network, PLC network, etc.), the description herein is not so limited, and may be applied to networks that have both shared media and unshared media (e.g., wireless and wired links).

Data transmissions 140 (e.g., traffic and/or packets/messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared media protocols. In this context, a protocol consists of a set of rules defining how the nodes interact with each other.

Figure 2:
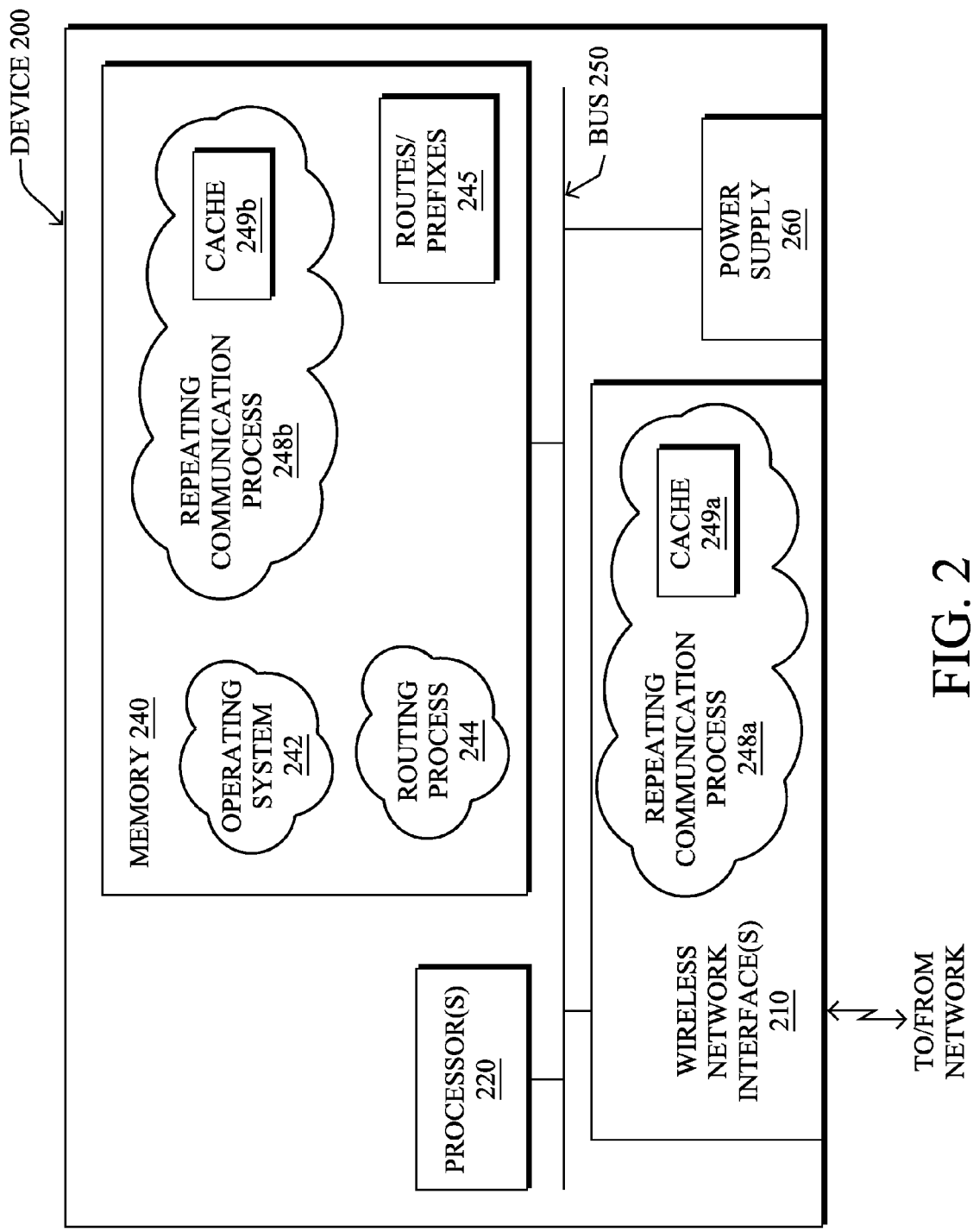
FIG. 2 illustrates an example network device/node.

FIG. 2 is a schematic block diagram of an example node/device 200 that may be used with one or more embodiments described herein, e.g., as nodes A-D. The device may comprise one or more shared media network interfaces 210, at least one processor 220, and a memory 240 interconnected by a system bus 250, as well as a power supply 260 (e.g., battery, plug-in, etc.).

The shared media network interface(s) 210 contain the mechanical, electrical, and signaling circuitry for communicating data over shared media links (e.g., wireless links, PLC links, etc.) coupled to the network 100. The network interfaces may be configured to transmit and/or receive data using a variety of different shared media communication protocols as noted above and as will be understood by those skilled in the art. In addition, the interfaces 210 may comprise an illustrative "repeating communication" process 248a (with cache 249a), which may be contained within a suitable shared media communication protocol process (e.g., as an extension to current protocols), and may be executed by an independent processor of the interface 210, not explicitly shown. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures, such as routes or prefixes 245 (notably on capable devices only). An operating system 242, portions of which are typically resident in memory 240 and executed by the processor, functionally organizes the device by, inter alia, invoking operations in support of software processes and/or services executing on the device. These software processes and/or services may comprise routing process/services 244, and optionally a repeating communication process 248b (with cache 249b), for use as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), is or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Figure 3:
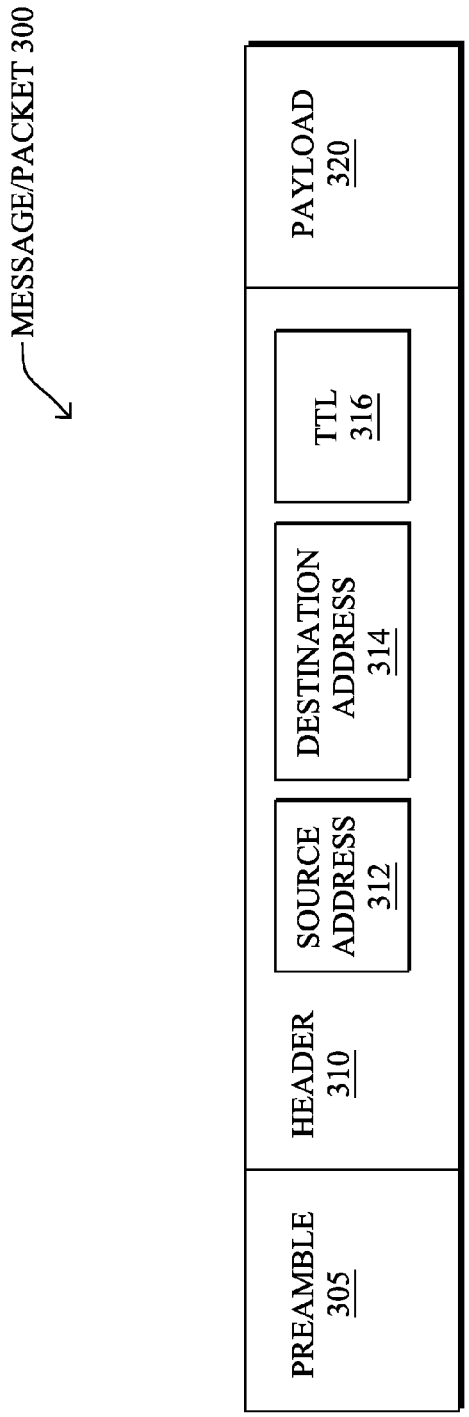
FIG. 3 illustrates an example message.

FIG. 3 illustrates an example simplified message/packet format 300 that may be used to communicate information between devices 200 in the network. For example, message 300 illustratively comprises a header 310 with one or more fields such as a source address 312, a destination address 314, and a time-to-live (TTL) field 316, as well as other fields, such as Cyclic Redundancy Check (CRC) error-detecting code to ensure that the header information has been received uncorrupted, as will be appreciated by those skilled in the art. Within the body/payload 320 of the message may be any information to be transmitted, such as user data, control-plane data, etc. In addition, based on certain wireless communication protocols, a preamble 305 may precede the message 300 in order to allow receiving devices to acquire the transmitted message, and synchronize to it, accordingly.

As mentioned above, Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-15> by Winter, at al. (Nov. 11, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

As noted above, one issue faced in LLNs is the relatively high degree of "lossy-ness", where the percentage of packets dropped can be high, and where the link quality is often not predictable, such as due to a number of factors, e.g., electromagnetic interference, noise, etc. For instance, for LLNs established using wireless communication and/or powerline communication (PLC), it is fairly common for links to flap with a very high frequency, and there is generally no way to predict link behavior. For instance, due to the lossy-ness, it is often the case that a node transmitting a shared media communication to another node may not always reach the intended recipient, or may reach the intended recipient, but may not always receive an acknowledgement (ACK) from the recipient (i.e., the ACK is lost in the return transmission).

For example, as shown in FIG. 4, the link between node C and node A may have failed in either direction (e.g., one or both), occasionally, frequently, or non-transiently (e.g., substantially lengthy periods of time to complete failure). For example, the lossy-ness may be caused by an obstacle, such as a vehicle, person, etc., blocking a "normal" airway path between two devices (while not blocking other alternative paths through other devices, as described herein). Accordingly, the communication between node C and node A may be particularly lossy.

Shared Media Networks with Repeater Nodes

As mentioned above, many of the link layers used in LLNs are a shared media, such as low power wireless links and PLC links. Although this may be a challenge in terms of resources management, congestion handling, and overall lossy-ness, the embodiments herein take advantage of the shared nature of these links, by benefiting from the fact that some nodes hear traffic between other pairs of nodes, even when they are not the intended recipient (e.g., destination) of these communications.

Specifically, according to one or more embodiments of the disclosure, a "repeater node" in a shared media network may intercept a shared media transmission from a first node to a second node. Once a shared media transmission is intercepted, the repeater node may determine whether the second node returns an acknowledgement (ACK) to the first node. If the second node does not return an ACK to the first node, the repeater node repeats the shared media transmission to the second node. Also, according to one or more additional embodiments of the disclosure, when receiving an ACK at the repeater node from the second node in response to the repeated shared media transmission, the repeater node may also forward the ACK from the second node to the first node.

Illustratively, the techniques described herein may be performed by hardware, software, and/or firmware, such as in accordance with repeating communication process 248 (a or b), which may contain computer executable instructions executed by the processor 220 to perform functions relating to the novel techniques described herein, such as within a shared communication interface (e.g., as part of a shared communication protocol). For example, the techniques herein may be treated as extensions to conventional wireless communication protocols, such as the 802.11 protocol, WiFi, etc., conventional PLC protocols, etc., and as such, would be processed by similar components understood in the art that execute such protocols, accordingly.

As shown in FIG. 4, assume that four nodes A-D can each see the other and receive messages sent by other nodes. Illustratively, in DAG-based routing, node A may be considered a parent node, and can communicate with nodes B, C, and D. In one specific scenario, as node A sends messages to node C, nodes B and D can hear the communication between A and C (including the acknowledgment (ACK) messages), and vice versa. Given the fact that the nodes are interconnected by lossy links (e.g., water, gas, electrical attached to different homes), at times the path between A and C may be degraded for a number of reasons, e.g., a vehicle may temporarily park at the location marked by the "X". According to the techniques described in detail below, when this situation occurs, node B and D can observe that, for example, when node C sends messages to node A, the messages are not being acknowledged. Nodes B and/or D may also observe that they can still communicate with node A. As a result, nodes B and/or D may (after having buffered/cached the original message) attempt to insert themselves in the message path between nodes A and C by repeating the message from C to A. Notably, as described in more detail below, this repeat communication occurs without changing routing information (e.g., the DAG shape), a key aspect of the embodiments herein that nodes intervene to fix a broken link issue without requiring such routing changes.

Operationally, certain nodes within the network 100 may first be established as repeater nodes. For instance, the nodes may determine whether they are to act as repeater nodes (assuming, that is, that they have the requisite capability). For example, in one embodiment, nodes B and D may advertise their candidacy, offering themselves as repeater nodes before any issue occurs. This allows nodes C and A to chose and/or authenticate the candidate repeater nodes (or "helping" nodes) ensure that repeated messages arrived via approved nodes and not via an attempt of cyber attacks or DoS (Denial of Service) attack. In accordance with another embodiment, a node (e.g., node C) may explicitly ask its neighbors to act as a repeating/helping node, e.g., for a pre-determined time duration, such that nodes within the vicinity may receive the request and enable the feature, accordingly.

Figure 5A:
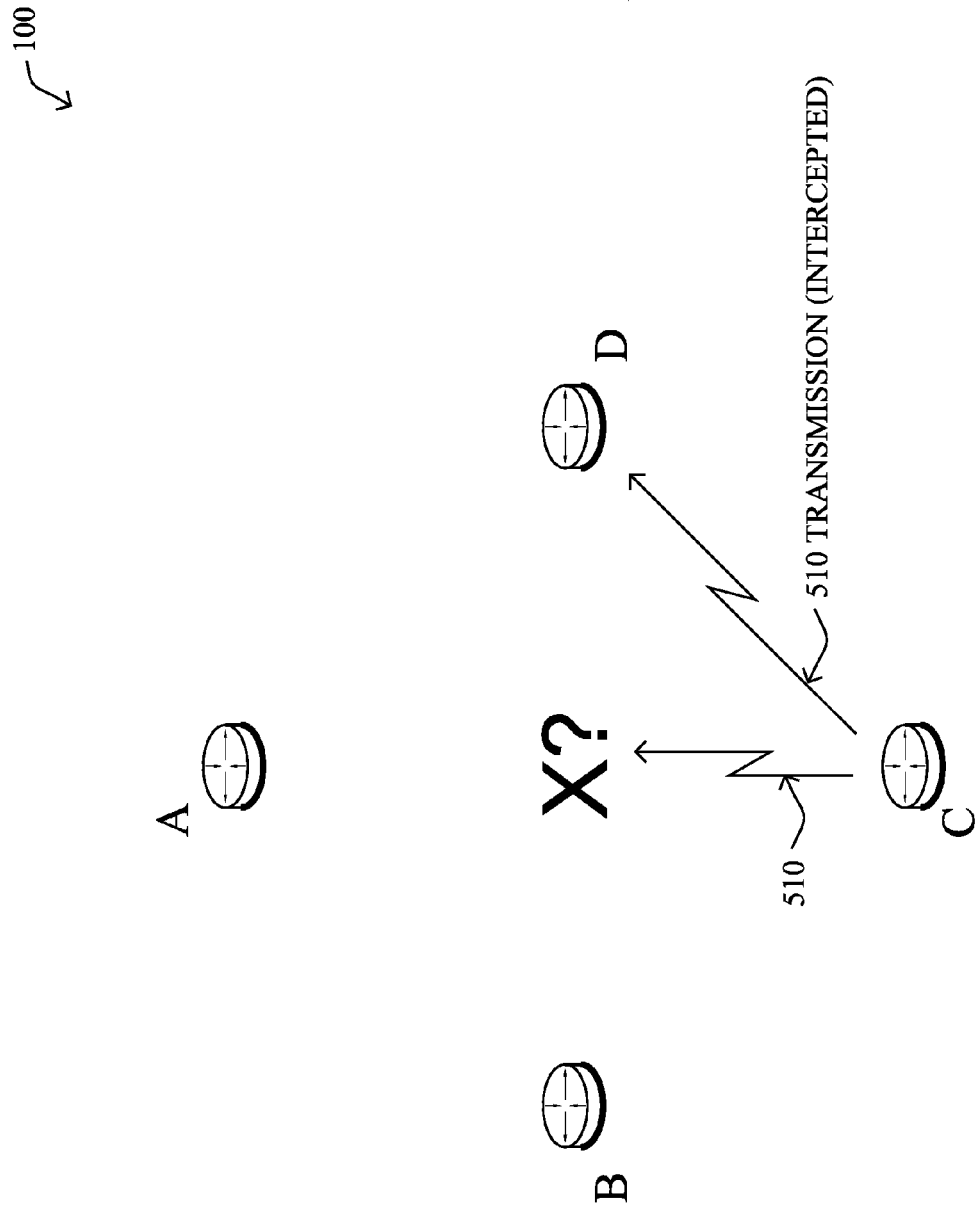
Figure 5C:
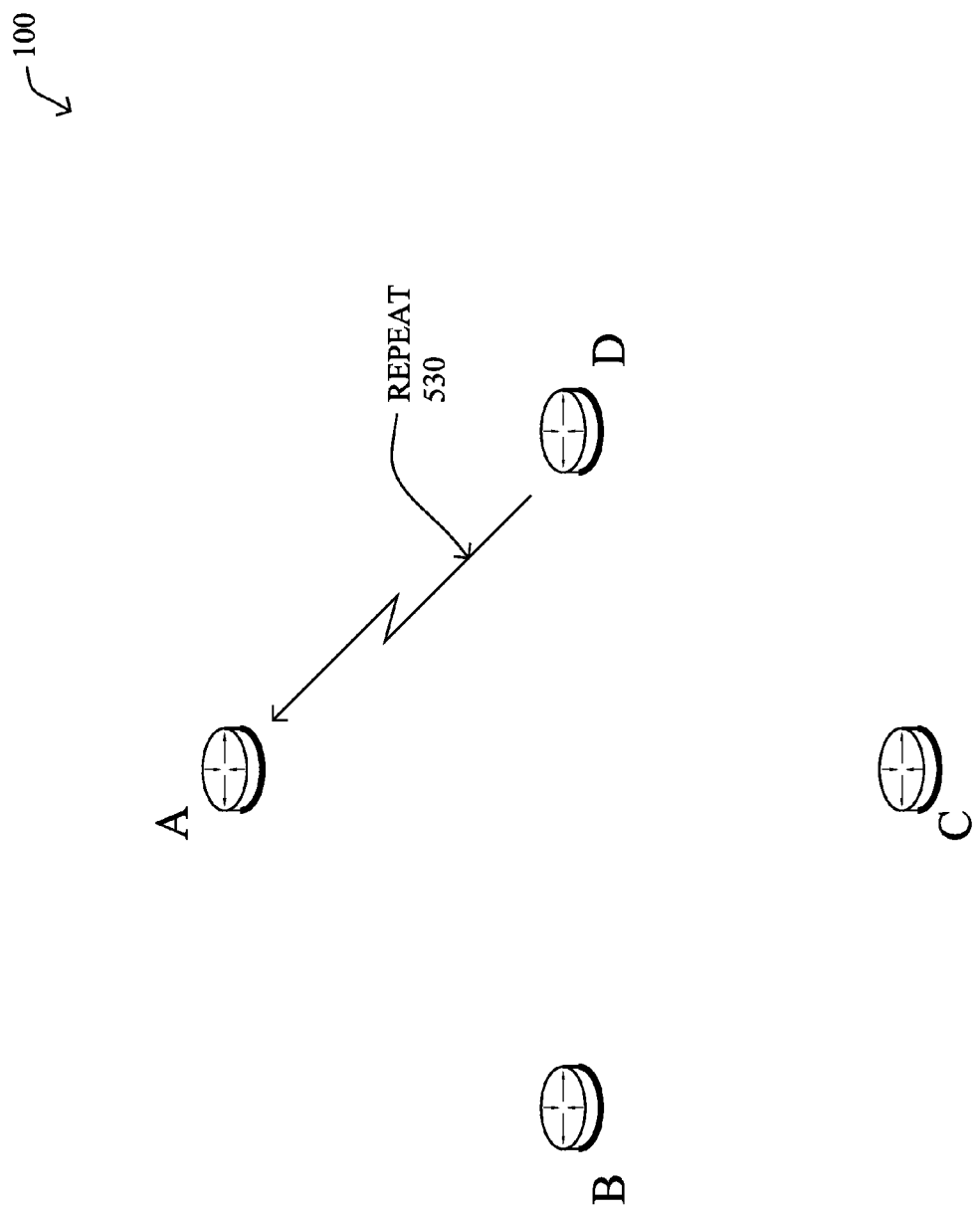

Once repeater nodes are established, these nodes may then listen to the shared media for communication. FIG. 5A illustrates the network 100 of FIG. 1 with a shared media communication (transmission 510) sent from node C toward node A. Whether or not the transmission 510, such as a message/packet 300, reaches node A, node D, a repeater node, may intercept the transmission. Accordingly, node D may cache/store the transmission (e.g., cache 249), and as shown in FIG. 5B, waits to hear an acknowledgment (ACK) 520 from node A. If the repeater node D determines that the ACK 520 is returned, then no action need be taken and the buffered packet may be flushed. However, in response to determining that node A did not return an ACK 520 to node C, the repeating node D repeats the shared media transmission 510 to node A as repeated transmission 530 as shown in FIG. 5C. Notably, the repeated transmission 530 may be a new type of message (e.g., a retransmitted packet), but generally repeats exactly a source address 312 (e.g., of node C), a destination address 314 (e.g., of node A), and payload 320 of the intercepted shared media transmission 510 from node C.

Figure 6B:
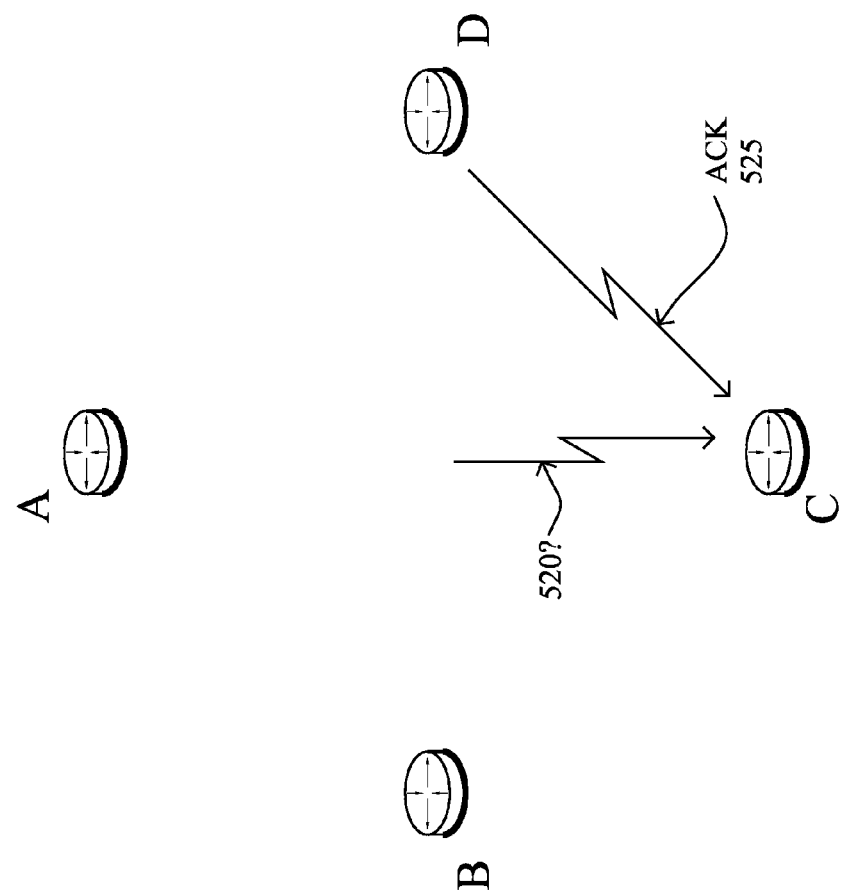

When node A acknowledges the repeated message as shown in FIG. 6A, the repeating node D may receive the ACK message 520, which was notably sent in response to the repeated shared media transmission 530. As shown in FIG. 6B, the repeating node may then forward the ACK message 520 to node C as a redirected/forwarded ACK 525. For instance, the forwarded ACK 525 may comprise a flag or other indication that it is an indirect ACK, that is, an ACK for a message for which a repeater node acted as a temporary repeater. Note that the link between node A and C may be operational in the opposite direction (from A to C), and the repeating node generally has no way to be aware of this. As such, node C may receive several ACKs (520/525, which may be identical) for the same initial transmission 510, in which case the duplicate transmissions may be simply discarded (other than the first originally received ACK, that is).

Figure 7B:
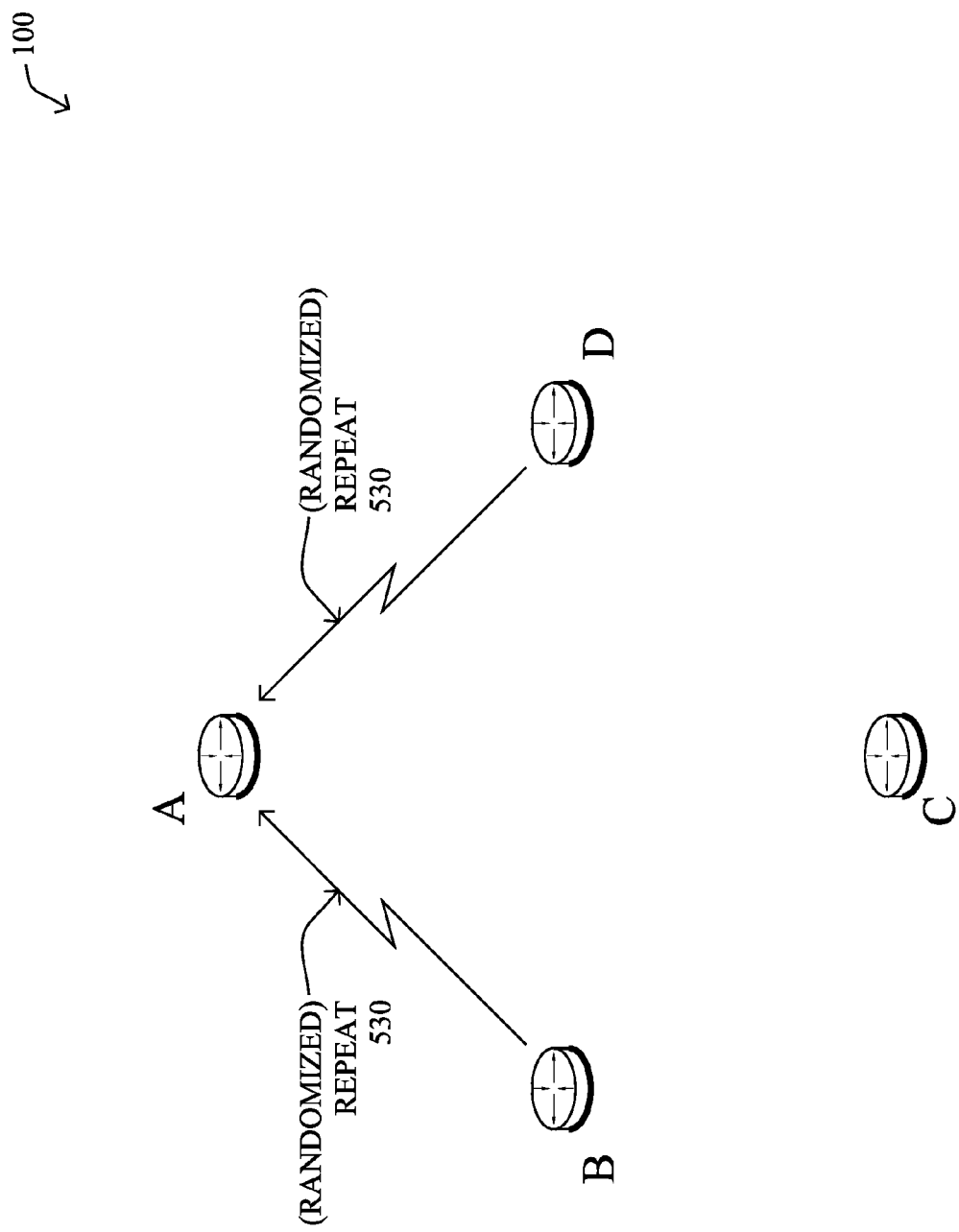

In certain situations, a sending node (node C) may have a plurality of repeater nodes within its vicinity, such as nodes D and B, as shown in FIG. 7A. As such, each repeater node may listen for a returned ACK 520 from node A, and if not received, may each send a repeat transmission 530 as shown in FIG. 7B. In one embodiment, repeater nodes (e.g., B and D) may randomize a time of the repeated shared media transmission in order to avoid collision of their retransmissions, as could occur when transmissions overlap at a receiver within a shared media network, as may be appreciated by those skilled in the art.

Note that node A keeps an identification of the transmission, such as a packet-ID, the packet itself, or the result of some hashing algorithm on the transmission. In case node A receives the same message several times, such as from multiple repeater nodes (for example one copy via a repeater node B and another copy via node D), it can discard of any duplicate messages. Note also that node A may receive node C's original transmission 510 as well, but due to the lossy-ness of the network, node D (or B) may not receive the ACK 520 that is returned. The repeater node may therefore erroneously think that node A did not receive the original sent message, and as a result, repeats the message. In this instance, node A may ignore the duplicate repeated transmission 530 from node D (or B) based on its stored packet/message IDs, or else may attempt to reissue an ACK to prevent further repeated messages. A similar technique may be used by node C to discard multiple ACKs from the repeater nodes or node A itself, as noted herein.

Figure 8A:
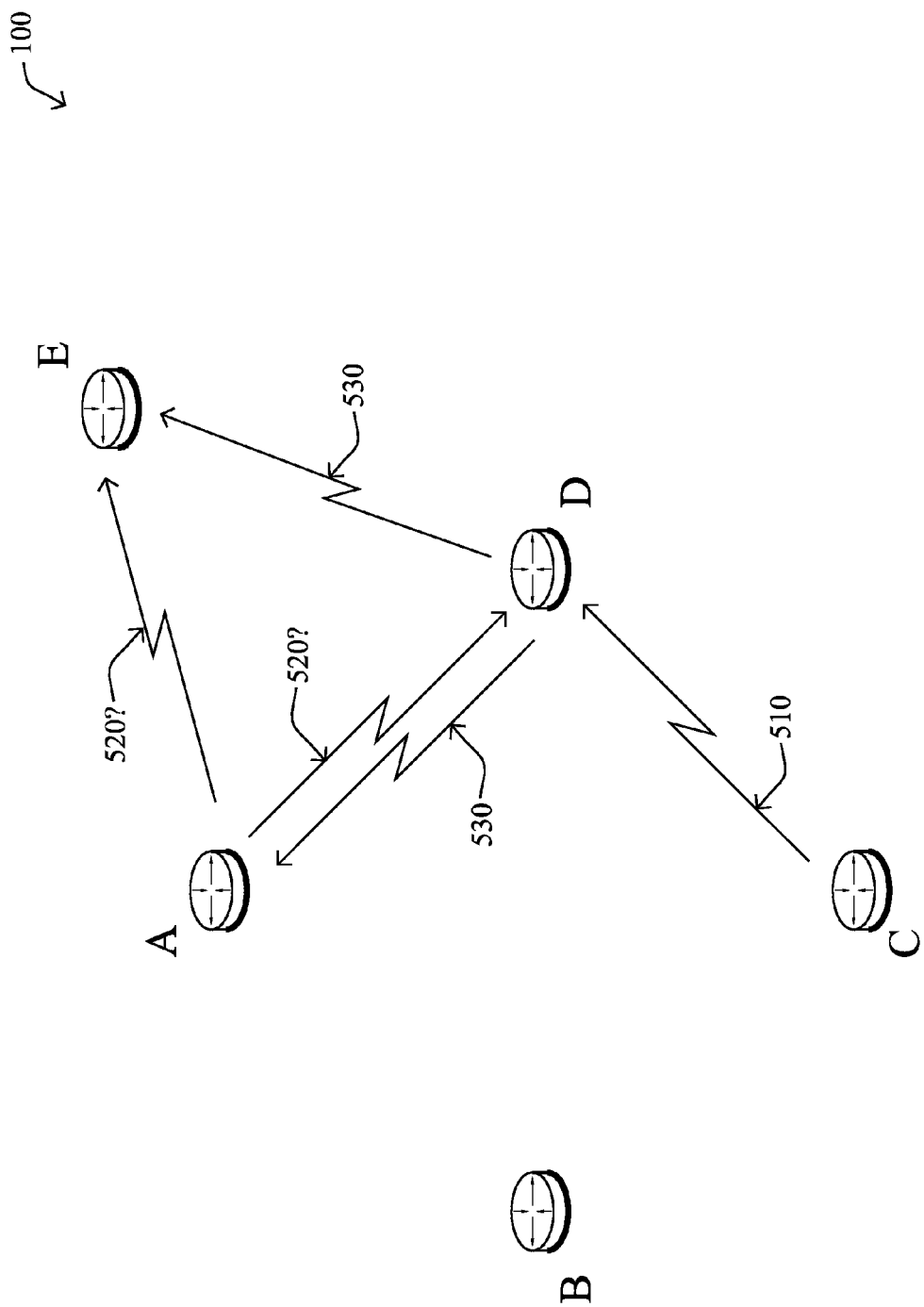
FIGS. 8A-B illustrate an example cascading message exchange for repeating transmissions.
Figure 8B:
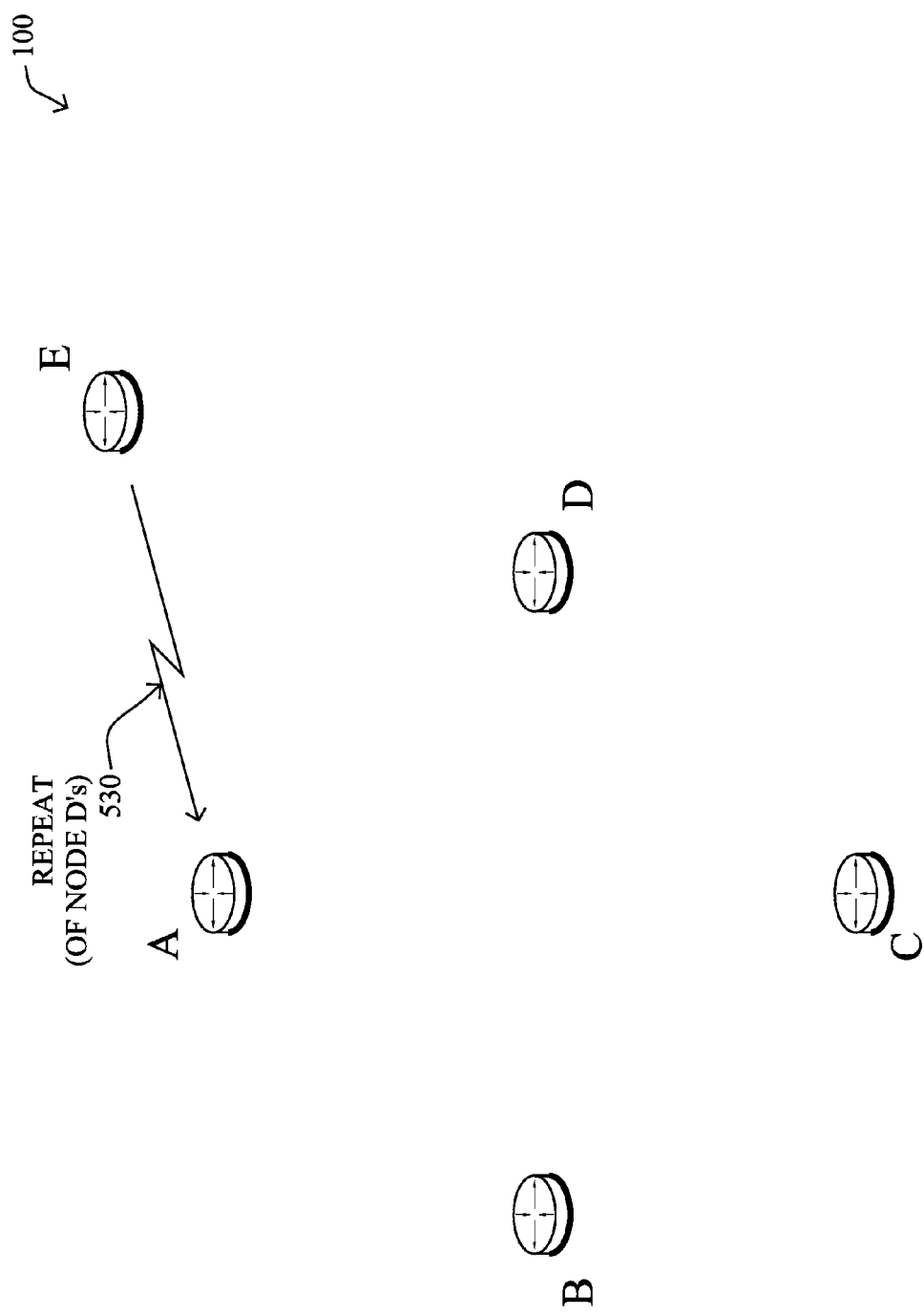

In another embodiment, the repeated message 530 may have a TTL (time-to-live) field 316 or other indication of the number of times the shared media transmission is to be repeated to reach the intended destination. For example, as shown in FIG. 8A, if node D does not see an ACK 520 for a message 510 that node C sent to node A, node D may send a repeat message 530 towards node A. A new node "E", an additional repeater node, may also receive the repeat message 530, and if node A does not ACK node D's repeat message, may initiate its own repeat message 530 as shown in FIG. 8B. Through decrementing a TTL counter in the TTL field 316 of each repeated message 530, if the counter (after being decremented) is set to 0 the message would not be repeated again by other potential repeating nodes. For example, if node E observes that the message from node D to A was not acknowledged, and if the TTL counter=0, node E may refrain from repeating the message which originated at node C and repeated by node D.

Further, in accordance with one or more additional embodiments described herein, broken links may be signaled. For instance, when a repeating node retransmits a communication (e.g., packet) 510 that was lost in the first place, the sender of the communication (e.g., node C) is not informed, and may continue to send packets without knowing that the link (e.g., to node A) has failed. Accordingly, a repeating node, e.g., after having repeated n number of messages for a period of time t, may decide to inform the sender that the link between node C and A is broken. Alternatively or in addition, the information may indicate that the repeater node helped a number of times n for a period of time t. Upon receiving this information, the sender (node C) may decide that the link has been non-operational for too long, thus triggering a topology repair, reroute, re-attachment to a different parent, etc. Accordingly, these additional embodiments may thus be used as a link failure detection mechanism.

Figure 9:
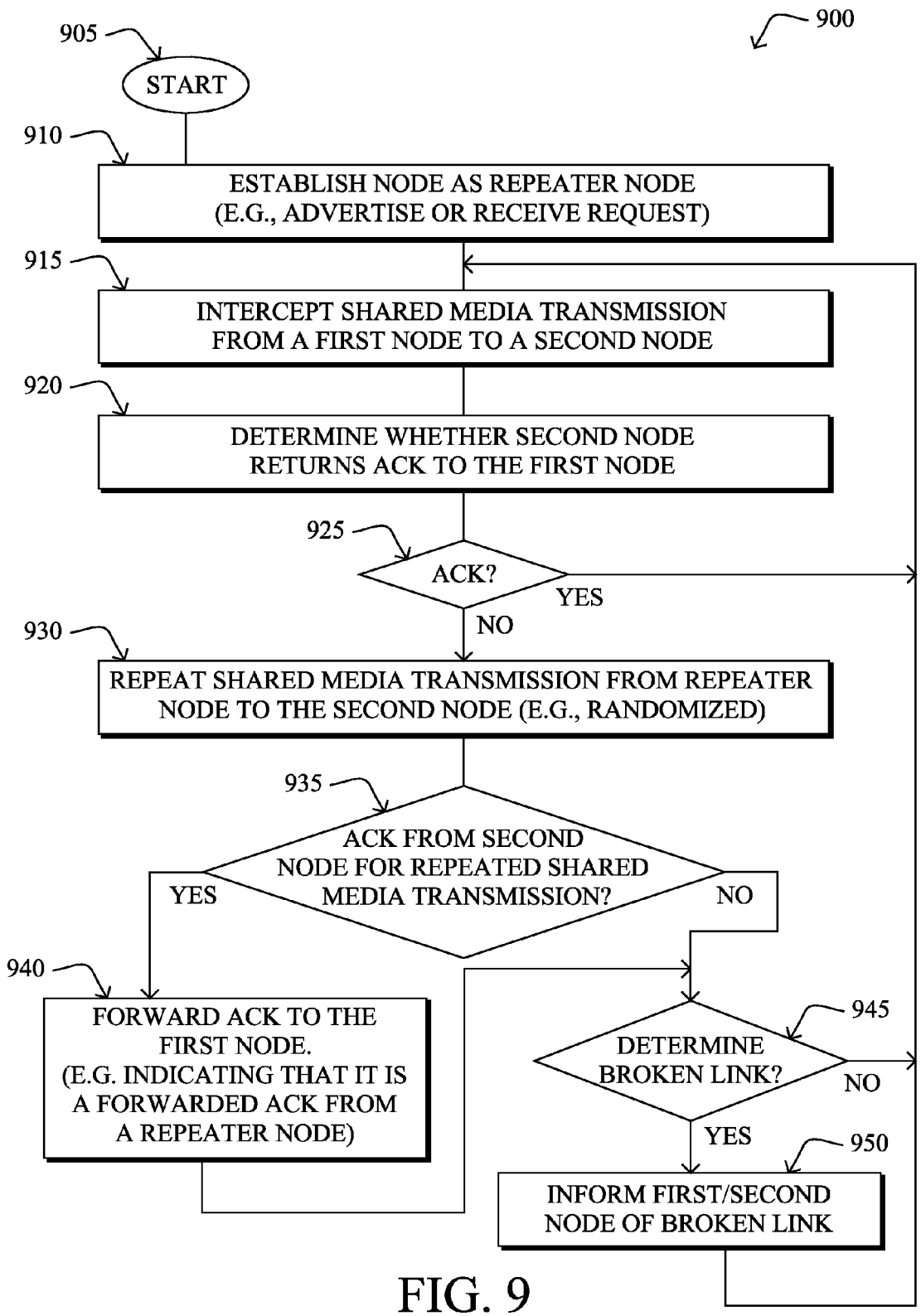
FIG. 9 illustrates an example simplified procedure for increasing communication opportunities with repeater nodes within a shared media network.

In closing, FIG. 9 illustrates an example simplified procedure for increasing communication opportunities by using repeater nodes within a shared media network in accordance with one or more embodiments described herein. The procedure 900 starts at step 905, and continues to step 910, where one or more nodes may be established within a shared media network as repeater nodes (e.g., D and or B), such as through configuration of the device which may be advertised, or else activated in response to a request from a local node. The repeater node (e.g., D) may then listen-in on the shared media, and may intercept a shared media transmission 510 from a first node (e.g., node C) to a second node (e.g., node A) in step 915. In step 920, the repeater node may, after caching the shared media transmission, listen-in on the shared media again to determine whether the second node returns ACK 520 to the first node.

In response to "hearing" an ACK 520 in step 925, the procedure 900 may return to step 915 to continue listening for transmissions to repeat. If, on the other hand, in step 925 it is determined (e.g., after a certain time period) that the second node has not sent an ACK 520 in response, thus indicating to the repeater node that the second node has not received the communication 510 from the first node (allegedly, at least, as noted above), then in step 930 the repeater node (e.g., D) repeats the shared media transmission to the second node as repeated message 530. As mentioned above, this repeat transmission may be randomized, such that if another repeater node (e.g., node B) is also repeating the transmissions, the repeater nodes may thus attempt to avoid collisions of the multiple transmissions.

In response to receiving an ACK 520 from the second node for the repeated shared media transmission in step 535, then in step 940 the repeater node may forward an ACK 525 to the first node. As noted above, the ACK 525 may indicate that it is a forwarded ACK from a repeater node. If there is no ACK in step 935 (e.g., at which time any additional repeater nodes for node D may attempt to repeat the repeated transmission), or even after receiving an ACK, in step 945 the repeater node may determine if the link is broken between the first node and second node, for example, based on one or more transmission loss thresholds. If there is a broken link (based on the thresholds), then in step 950 the repeater node may inform the first node and/or second node of the broken link, such that possible corrective action (e.g., convergence) may take place. The procedure 900 returns to step 915, such that the repeater node(s) may continue listening to the shared media for potentially lost transmissions.

The novel techniques described herein, therefore, increase communication opportunities within a shared media network (e.g., wireless, PLC, etc.). In particular, by providing repeater nodes that take advantage of the nature of shared media (e.g., listening on wireless and PLC links), the novel techniques allow nodes within the vicinity of a sender and receiver retransmit lost packets between the sender and receiver. Specifically, the techniques herein do not require a topology change to the network, especially if the failure is transient. In other words, the one or more embodiments described herein dramatically increases the level of reliability of lossy links by using helpful repeater nodes that retransmit lost traffic without requiring expensive topology changes, thus smoothly handling packet loss. In addition, the techniques can even be used to detect link failure so as to trigger a topology change, e.g., should the sender decide to attach to another parent (in DAGs) in the presence of a non-transient failure.

While there have been shown and described illustrative embodiments that increase communication opportunities within a shared media network through repeater nodes, it is to be understood that various other adaptations and modifications may be made within the spirit and scope of the embodiments herein. For example, the embodiments have been shown and described herein with relation to LLNs, and more particular, to wireless and PLC LLNs. However, the embodiments in their broader sense are not as limited, and may, in fact, be used with other types of networks and/or shared media protocols.

Note also that while the techniques described above essentially describe repeating potentially lost transmissions regardless of their content, the embodiments above may be extended to allow a degree of transmission categorization. For instance, certain transmissions, such as high priority packets, packets from certain nodes in a network, packets to certain nodes in a network, etc., may be repeated, while others may not. Further, in this same extension, certain transmissions may always be repeated, while others may be repeated in response to a potential/detected transmission loss, and while still other transmissions need not be repeated at all.

Also, in one or more alternative embodiments, the repeater nodes may be configured to indiscriminately repeat ACKs. For instance, since the repeated nodes are generally unaware of whether the returned ACK 520 is received by the sender node (node C), the repeater nodes may be configured to always return an ACK 525 in response to receiving the ACK 520 itself (FIGS. 6A and 6B above). That is, the repeater nodes in these alternative embodiments don't just send an ACK 525 only if they previously repeated the initial transmission, but act as ACK repeaters to ensure that the sending node (node C) is aware that its transmission was received in case the link from C to A was functional, but from A to C for the returned ACK 520 is not.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    intercepting, at a listening node in a shared media network, the shared media transmission from a first node to a second node, wherein the first and second nodes are transmitting nodes;
    determining, by the listening node, whether the second node returns an acknowledgement (ACK) in response to the shared media transmission from the first node;
    in response to determining, by the listening node, that the second node did not return an ACK to the first node:
        inserting, by the listening node, itself into a transmission path of the shared media transmission, and
        repeating, by the listening node, the shared media transmission from the listening node to the second node wherein this repeated shared media transmission is a first transmission of the shared media transmission from the listening node;
    receiving the ACK at the listening node from the second node in response to the repeated shared media transmission; and
    forwarding the ACK from the listening node to the first node,
    wherein the forwarded ACK is identical to the ACK received from the second node.

2. The method as in claim 1, further comprising:
    advertising candidacy of the listening node to be a repeater node, wherein the listening node is chosen as a repeater node by at least one of either the first node or second node.

3. The method as in claim 1, further comprising:
    receiving a request at the listening node from at least one of either the first node or second node, the request requesting that the listening node act as a repeater node.

4. The method as in claim 1, further comprising:
    informing at least one of either the first node or second node of a broken link between the first node and second node in response to repeating the shared media transmission.

5. The method as in claim 4, further comprising:
    determining the broken link in response to a given number of repeated shared media transmissions between the first node and second node.

6. The method as in claim 4, further comprising:
    determining the broken link in response to a certain number of repeated shared media transmissions between the first node and second node within a given period of time.

7. The method as in claim 1, further comprising:
    indicating within the repeated shared media transmission a number of times the shared media transmission is to be repeated to reach the second node.

8. The method as in claim 1, further comprising:
discarding, by at least one of either the first node or second node, duplicate shared media transmissions.

9. The method as in claim 1, further comprising:
randomizing a time of the repeated shared media transmission.

10. The method as in claim 1, wherein repeating comprises:
repeating a source address, destination address, and payload of the intercepted shared media transmission.

11. The method as in claim 1, wherein the shared media transmission is a wireless communication or a powerline communication.

12. An apparatus, comprising:
one or more shared media network interfaces adapted to communicate with a first node and second node in a shared media network, wherein the apparatus is a listening node;
a processor coupled to the network interfaces and adapted to execute one or more processes; and
a memory configured to store a process executable by the processor, the process when executed operable to:
listen and intercept, by the listening node, a shared media transmission from a first node to a second node;
determine, by the listening node, whether the second node returns an acknowledgement (ACK) in response to the shared media transmission from the first node, wherein the first and second nodes are transmitting nodes and the apparatus is a listening node;
after a determination that the second node did not return an ACK to the first node:
insert, by the listening node, itself into a transmission path of the shared media transmission, and
repeat, by the listening node, the shared media transmission to the second node, wherein this repeated shared media transmission is a first transmission of the shared media transmission from the listening node;
receive, by the listening node, the ACK from the second node in response to the repeated shared media transmission; and
forward, by the listening node, the ACK to the first node, wherein the forwarded ACK is identical to the ACK received from the second node.

13. The apparatus as in claim 12, wherein the process when executed is further operable to:
advertise candidacy of the apparatus to be a repeater node, wherein the apparatus is chosen as the repeater node by at least one of either the first node or second node.

14. The apparatus as in claim 12, wherein the process when executed is further operable to:
inform at least one of either the first node or second node of a broken link between the first node and second node in response to a repetition of the shared media transmission.

15. The apparatus as in claim 12, wherein the process when executed is further operable to:
indicate within the repeated shared media transmission a number of times the shared media transmission is to be repeated to reach the second node.

16. The apparatus as in claim 12, wherein the process when executed is further operable to:
randomize a time of the repeated shared media transmission.

17. The apparatus as in claim 12, wherein the shared media transmission is a wireless communication or a powerline communication.

18. A tangible, non-transitory, computer-readable media having software encoded thereon, the software when executed by a processor operable to:
listen and intercept a shared media transmission from a first node to a second node by a listening node, wherein the first and second nodes are transmitting nodes;
determine, by the listening node, whether the second node returns an acknowledgement (ACK) in response to the shared media transmission from the first node;
after a determination that the second node did not return an ACK to the first node:
insert, by listening node, itself into a transmission path of the shared media transmission, and
repeat, by the listening node, the shared media transmission to the second node, wherein this repeated shared media transmission is a first transmission of the shared media transmission from the listening node;
receive, by the listening node, the ACK from the second node in response to the repeated shared media transmission; and
forward, by the listening node, the ACK to the first node, wherein the forwarded ACK is identical to the ACK received from the second node.

* * * * *